July 5, 1955 H. C. HANSON 2,712,442
SELECTIVE FEED MECHANISM FOR STAMP DISPENSING MACHINE
Filed Jan. 15, 1951 5 Sheets-Sheet 1
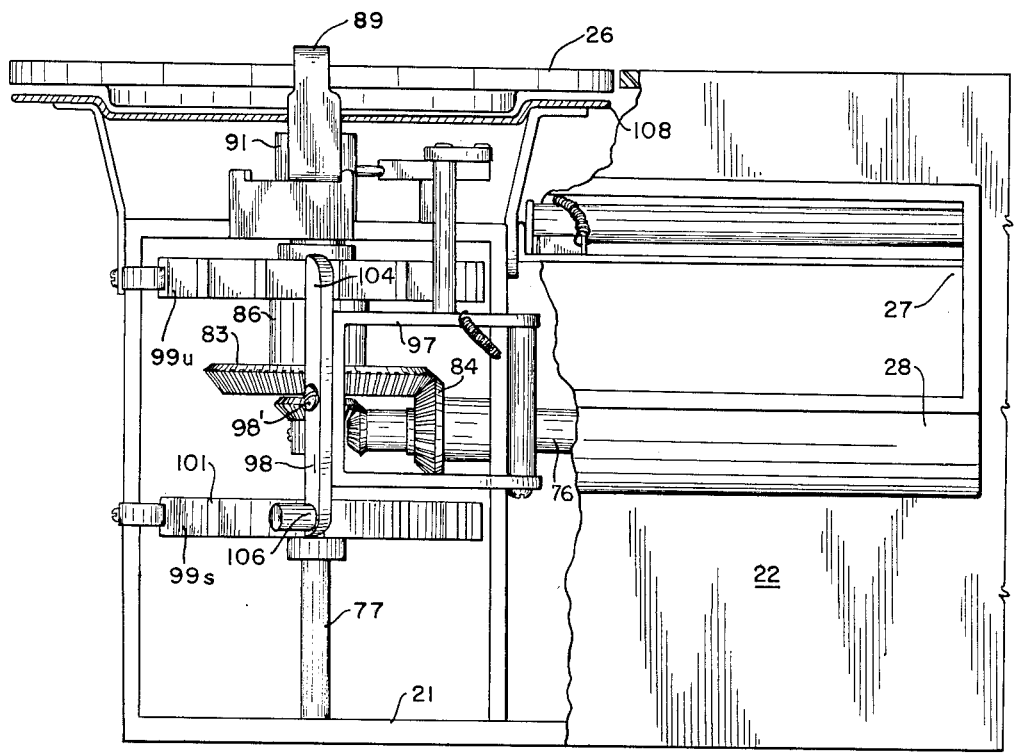
FIG. — 2
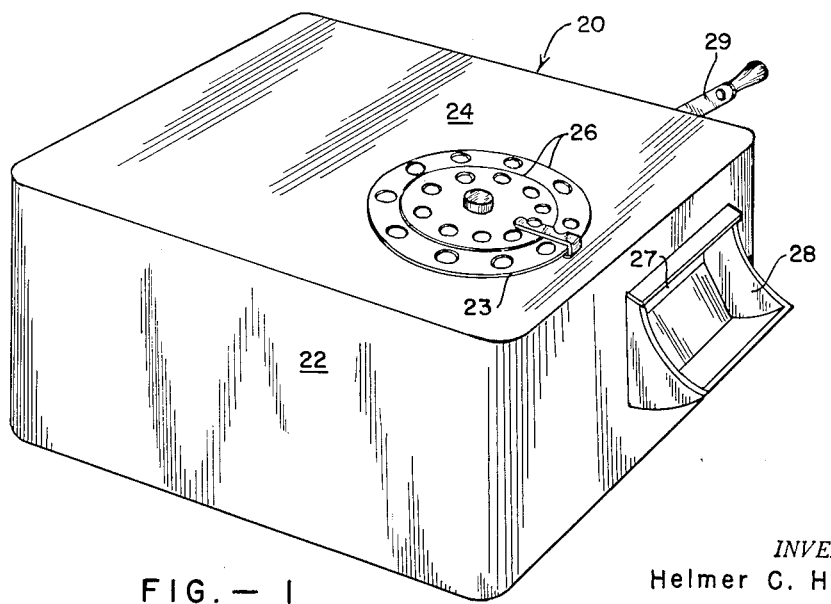
FIG. — 1
INVENTOR.
Helmer C. Hanson
BY
ATTORNEY July 5, 1955  H. C. HANSON  2,712,442
SELECTIVE FEED MECHANISM FOR STAMP DISPENSING MACHINE
Filed Jan. 15, 1951  5 Sheets-Sheet 2
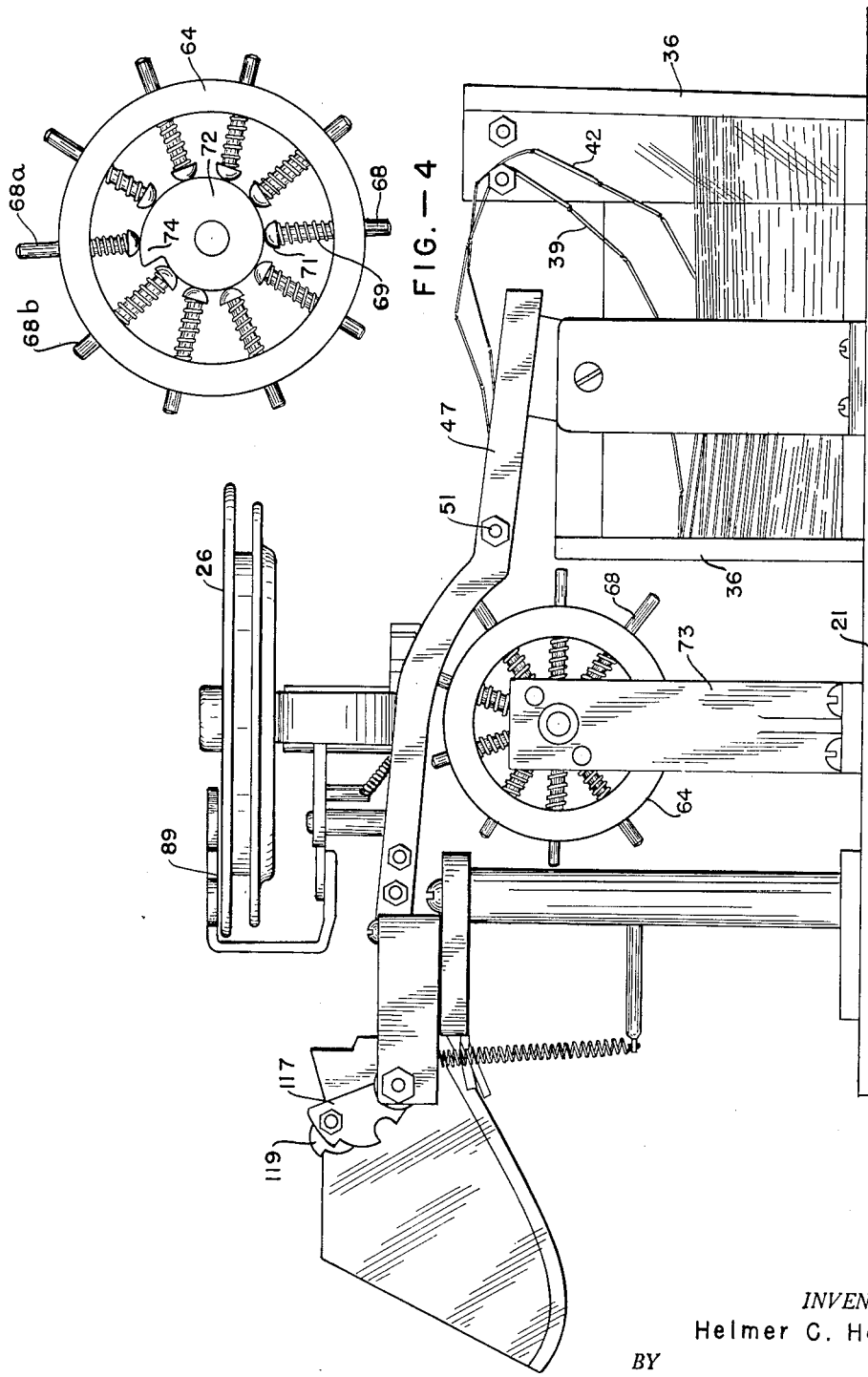
INVENTOR.
Helmer C. Hanson
BY
ATTORNEY July 5, 1955          H. C. HANSON          2,712,442
SELECTIVE FEED MECHANISM FOR STAMP DISPENSING MACHINE
Filed Jan. 15, 1951          5 Sheets-Sheet 3
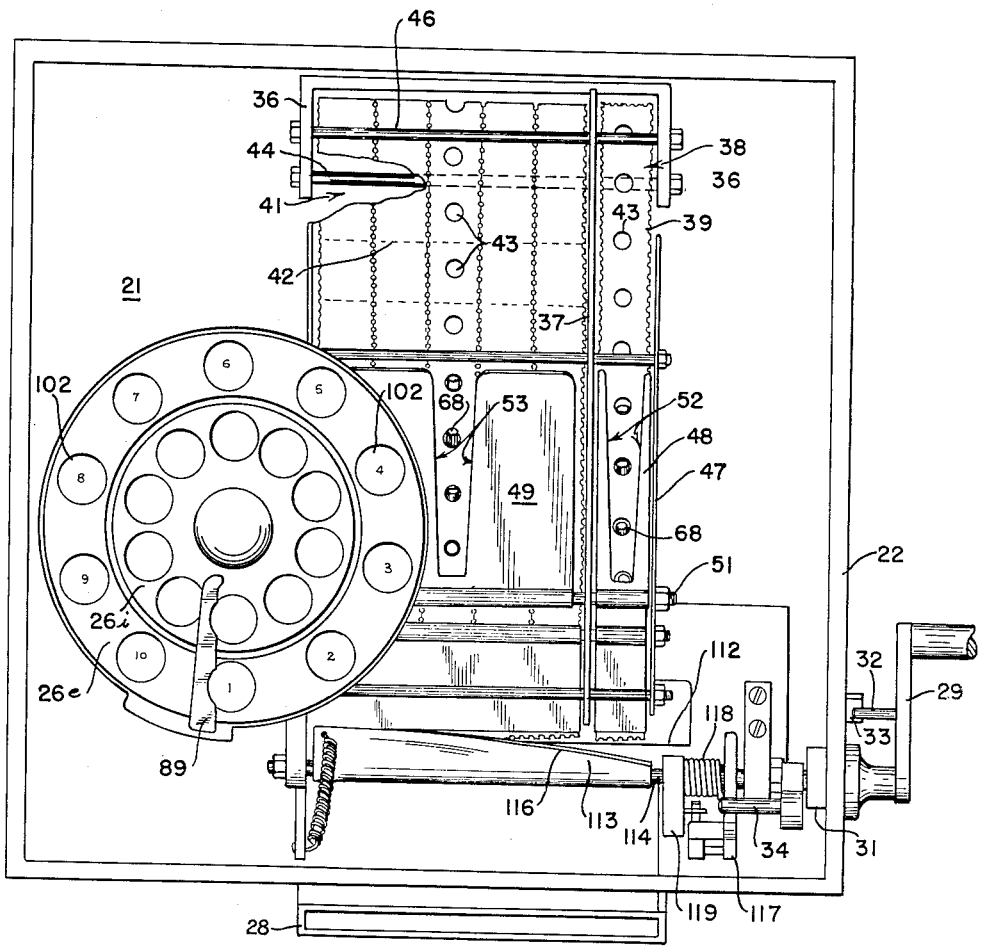
FIG.—5
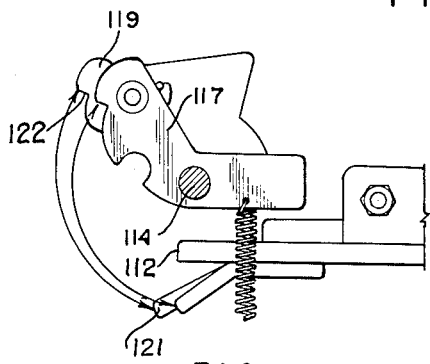
FIG.—6
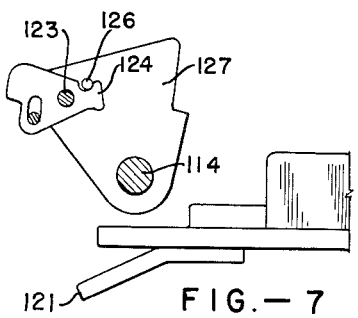
FIG.—7
*INVENTOR.*
Helmer C. Hanson
BY
*H. A. McGrew*
ATTORNEY July 5, 1955     H. C. HANSON     2,712,442
SELECTIVE FEED MECHANISM FOR STAMP DISPENSING MACHINE
Filed Jan. 15, 1951                                       5 Sheets-Sheet 5
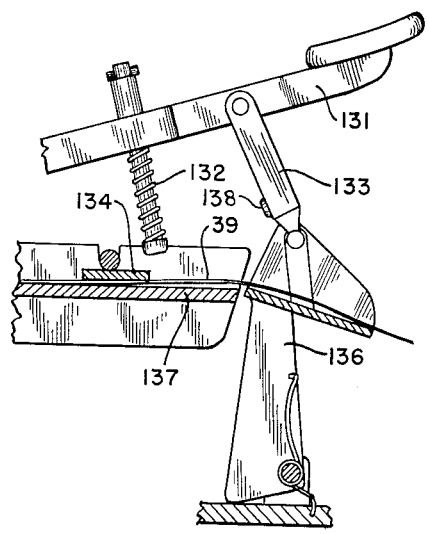
FIG.—11
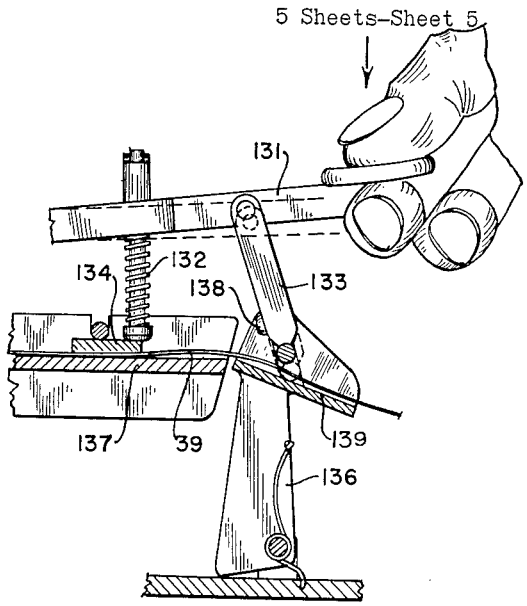
FIG.—12
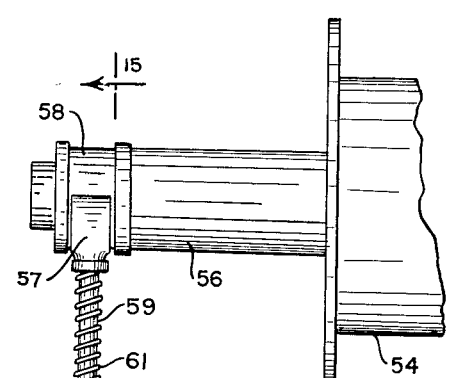
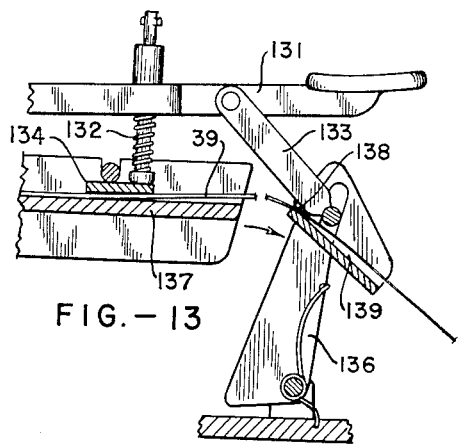
FIG.—13
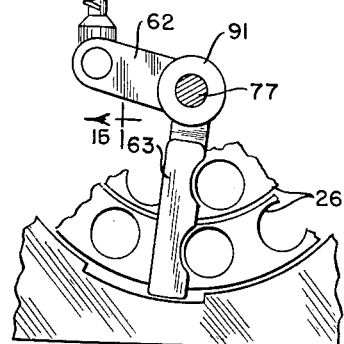
FIG.—14
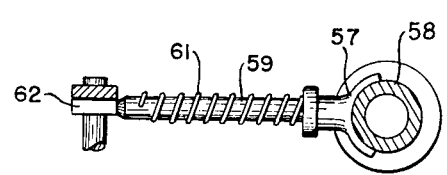
FIG.—15
*INVENTOR.*
Helmer C. Hanson
BY
*H. A. McGrew*
ATTORNEY

United States Patent Office 2,712,442
Patented July 5, 1955

2,712,442

SELECTIVE FEED MECHANISM FOR STAMP DISPENSING MACHINE

Helmer C. Hanson, Loveland, Colo., assignor of one-half to Paul H. Draper, Loveland, Colo.

Application January 15, 1951, Serial No. 206,031

6 Claims. (Cl. 271—2.4)

This invention relates to a mechanism for dispensing sheets of strip material and more particularly to a machine for dispensing stamps, tickets or other items that may be printed on long strips of paper.

Previously many different types of stamp dispensing or ticket dispensing mechanisms have been designed and built. In general, the primary aims of all such mechanisms is to provide a controlled drive mechanism that will move the desired number of units past a given cut-off point so that the severed units, whether they are tickets, stamps or other similar items, may be presented to a customer or other person utilizing the said units.

While the mechanism described in this invention could be used to dispense admission tickets and the like, it has been particularly designed to dispense merchandise stamps of the type now distributed by many stores as a bonus or participation dividend for customers. In accordance with present merchandising practice where stamps of this nature are utilized, it is customary to give the number of stamps for each purchase that corresponds to the number of basic money units represented by such purchase. For example, if a stamp is to be given for each dime or ten cents spent, the purchaser of a dollar item should receive ten stamps. At present the stamps used for this purpose are removed from a sheet supply of stamps by hand and presented to the customer. Through long experience, the present inventor has found this hand method of dispensing merchandise stamps to be very bothersome and time consuming. Accordingly, a primary object of this inventor has been to design and build a stamp dispensing machine that will automatically dispense the required number of stamps for each purchase.

In satisfaction of the primary objective, the inventor has been guided by the following additional objectives:

To provide a stamp dispensing machine having provision for receiving and holding a considerable number of stamps; to provide separate mechanism for dispensing stamps of the same denomination in unitary and fractional quantities respectfully; to provide a stamp dispensing mechanism adapted to dispense varying numbers of stamps, said stamps being of different aggregate size; to provide a stamp dispensing mechanism having a rotating member therein adapted for engagement with the stamps, said rotating member having a plurality of outwardly extending spurs thereon for cooperative engagement with holes in said stamps; to provide a stamp dispensing drive mechanism in which a plurality of radially extending stamp engaging spurs are selectively moved outwardly into contact with the stamps and successively away therefrom in a manner preventing damage to the stamps passing over such dispensing mechanism; to provide a stamp dispensing mechanism in which dial selector mechanism may be rotated to dispense any required number of stamps in single stamp increments; to provide a stamp dispensing mechanism incorporating unique cut-off or severing means; to provide a stamp dispensing machine in which a first dial selector and drive mechanism are interconnected to dispense a desired number of single strip stamps and in which a second dial selector and drive mechanism are adapted to dispense the required number of stamps in ten unit groups; and to provide a compact unitary stamp dispensing machine that may be readily adapted for use in various physical positions.

Additional objects and advantages of the present invention will be apparent from the appended description and drawings in which:

Fig. 1 is a perspective view showing the arrangement of a preferred embodiment of the invention;

Fig. 2 is a front elevational view in partial section showing features of the drive and dial selector mechanisms utilized;

Fig. 3 is a side elevational view showing the arrangement and positioning of a stamp reservoir, a stamp engaging drive wheel, a stamp severing or cutting mechanism and the dial selector;

Fig. 4 is an elevational view showing the operational features of the drive mechanism;

Fig. 5 is a top plan view showing the arrangement of elements in a preferred embodiment of the invention;

Fig. 6 is a sectional elevation showing operational features of the cutting mechanism;

Fig. 7 is an elevational view showing additional features of the cutting mechanism;

Fig. 11 is a side elevational view showing a first operational feature of an optional stamp severing mechanism;

Fig. 12 is a side elevation showing a second step in the operation of the optional stamp severing mechanism;

Fig. 13 is a side elevation showing a third step in the operation of an optional stamp severing mechanism;

Fig. 14 is a partial plan view showing the features of an optional type of stamp retaining mechanism, and Fig. 15 is a detailed elevation showing additional features of the brake mechanism shown in Fig. 14.

Figure 8:
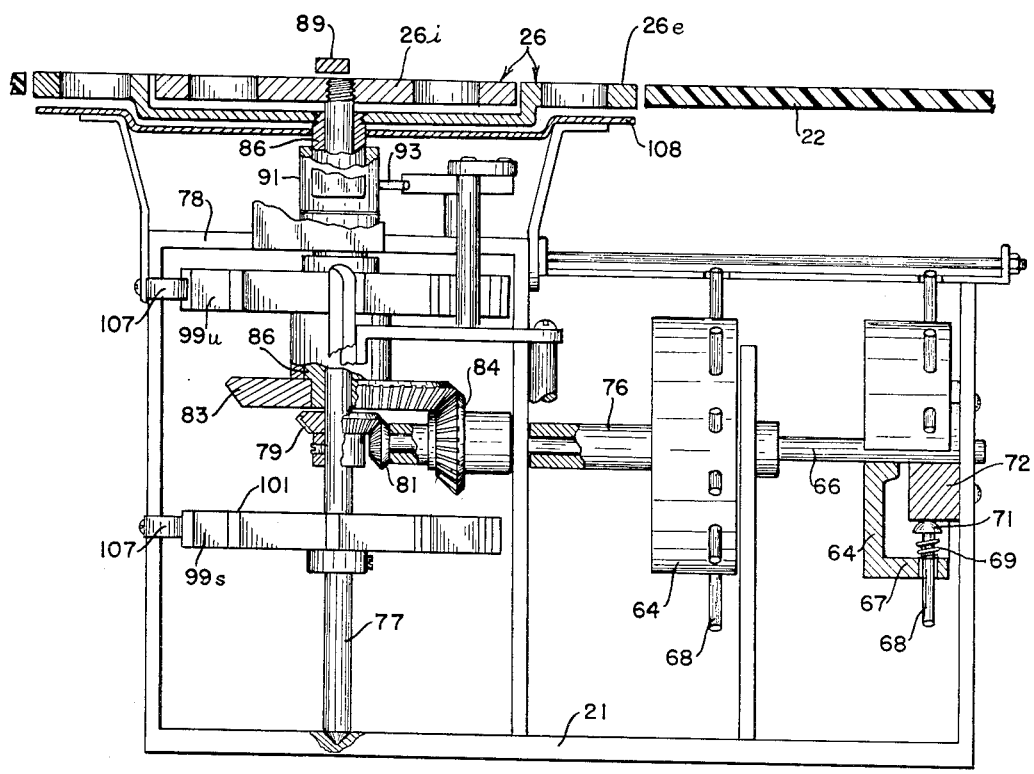
Fig. 8 is a front elevational view showing operational features of the dial selector and drive mechanism.

Briefly stated, the present invention provides a stamp dispensing machine in which two separate concentric dial selectors are used to drive intermediate gear mechanisms that are connected to separate drive members. These drive members are positioned and adapted to engage separate strips of stamps so as to pull the stamps away from a stamp supply retainer and move the stamps forwardly past a shearing mechanism. The dial selectors and the drive mechanisms are cooperatively geared so that rotation of one dial selector will deliver from one to ten stamps in one stamp increments, whereas rotation of the other dial selector would deliver from ten to one hundred stamps in ten stamp increments.

The drive mechanism mentioned incorporates a special feature inasmuch as a plurality of reciprocally mounted spurs are provided that move outwardly into engagement with holes provided in the stamps to move the stamps past the drive mechanism and subsequently the reciprocally mounted spurs are withdrawn from engagement with the stamps in a manner that prevents tearing or mutilation of the stamps.

Two distinct types of stamp cutting or severing mechanisms are provided, one of which utilizes a spring-loaded, trip actuated rotary cutting blade, which shears the dispensed stamps from the supply roll and a second mechanism utilizing lever arrangements so as to pull or tear the dispensed stamps from the supply roll. Where a supply roll of stamps is used, a special brake mechanism is interconnected with the dial stop so that the dispensing roll will not rotate under inertia forces after the desired number of stamps has been dispensed.

Referring now to drawings, the general structural features of the present invention are best shown in Figs. 1, 2, 3 and 5. In these figures it will be noted that base plate 21 provides support for a plurality of upright members and frame supports. Preferably, a cover 22 is provided to enclose the entire structure of the stamp dispensing machine 20. This cover 22 has an opening 23 in its upper face 24 of a size adapted to cooperatively receive the separately mounted dial selectors 26. In addition to the opening 23 in the upper face 24, a forward face of the cover 22 provides an opening 27 adjacent to which a stamp receiving chute 28 is placed. Preferably the chute 28 should be of sufficient size to easily admit the stamp machine operator's hand, so that the dispensed stamps may be readily removed from the chute 28. The cover 22 further provides support for a cutter energizing handle 29. This handle 29, which is rotatably mounted in bearings 31 provided in a side of the cover 22, has a stop pin 32 on one portion thereof adapted for cooperative engagement with a stop 33, supported by the cover 22.

Since it is desirable to remove the cover 22 at various times to refill the machine with additional stamps or for other purposes, the handle 29 is not permanently connected to the mechanism enclosed within the cover 22. To avoid such direct connection, the internal drive arm 34 of the handle 29 merely extends into the interior of the cover 22 at a position where it will engage the cutter mechanism housed within the cover 22. When the cutter mechanism shown in Figs. 11, 12 and 13 is used, it is of course, necessary to provide an additional opening in the cover 22, so that the entire cutter mechanism will extend therethrough.

Within the cover 22 and supported by the base 21, there are a number of mechanisms and structural features, the details of which can perhaps best be described separately.

Stamp supply

Among the units enclosed within the cover 22 and basically necessary to the operation of the stamp machine 20 is the stamp supply itself. In the drawings illustrating this invention, there is shown two separate forms of stamp supply. The first and preferred form as shown in Figs. 3 and 5 entails only the use of a box-like structure 36 supported above the base 21 into which a plurality of stamps may be folded. Since separate supplies of stamps are to be provided, a division member 37 divides the box-like structure 36 into separate parts. A first compartment is adapted to receive a first strip of stamps 39 that is only one stamp wide, the remaining compartment 41 receives and holds a long strip of stamps 42 that is five stamps wide. As will be noted in Fig. 5, each of the separate strips of stamps 39 and 42, is provided with a plurality of centrally positioned and equally spaced openings 43. The strips of stamps 39 and 42 are folded in box 36 in manifold layers, so that as the stamps are dispensed from the box, they will alternately be drawn from one end or the other of compartments 38 and 41. In order to prevent any catching and consequent tearing of the stamps as they pass out of the box 36, each of the strips 39 and 42 are threaded over guide bar 44 and under the guide bar 46. After passing over the guide bar 44, the stamps are received in a chute 47 for passage therealong. Separate pivoted plates 48 and 49 are mounted above the chute 47 to hold the stamps 39 and 42 down against the base of the chute 47. As shown in Fig. 5, these plates are mounted for pivotal movement about a rod 51 supported by opposite sides of the chute 47. The plates 48 and 49 provide a cutout portion 53 and 52 adjacent to the holes 43 and the strips 39 and 42.

A separate type of stamp supply device is shown in Fig. 14, where it will be seen that a drum 54, mounted unitarily with a support shaft 56, is provided for rotation about a horizontal axis disposed toward the rear of the stamp dispensing machine 20 adjacent the position shown for the supply 36. When the dispenser drum 54 is used, single width and multiple width stamps 39 and 42 may be wound on separate portions of the drum 54 to be dispensed therefrom. Since a drive mechanism is provided to pull the stamps from the box 36 or from the drum 54, it is unnecessary to drive the shaft 56. However, it is necessary to provide mechanism for stopping the drum's rotation when the desired number of stamps has been dispensed. To accomplish this desired result, a brake mechanism as shown in Figs. 14 and 15 is utilized. This mechanism includes the use of a brake shoe 57 formed for cooperative engagement with a brake portion 58 of the shaft 56. The yoke shaped brake shoe 57 is reciprocally mounted on push rod 59 and spring 61 tends to hold the brake shoe 57 in extended position. When it is desired to stop rotational movement of this drum 54, it is only necessary to move the push rod 59 toward the brake portion 58 of the shaft 56. This movement is accomplished through use of an eccentric arm 62 directly connected to the dial stop 89, that is engaged by the stamp machine operator's finger as the dial selectors 26 are rotated to the full stop position.

Stamp drive mechanism

In order to pull the stamps 39 and 42 out of the box 36 or away from the dispensing drum 54, a drive mechanism is necessary that will move the stamps along the chute 47. Since there are two separate strips of stamps 39 and 42, it is necessary in this embodiment of the invention to provide at least two stamp drive mechanisms. Since the structural features of each of these mechanisms are the same, these features will be described only in conjunction with a single drive mechanism. The features mentioned are best shown in Figs. 3, 4 and 5 and 8. In these figures it is shown that an open ended drum type member 64 is secured to a drive shaft 66. The drum member 64 has a plurality of equally spaced openings in the cylindrical face 67 thereof. An equal number of pins or spurs 68 are provided to extend through the openings in the drum face 67 and springs 69 are provided for compression between the head 71 on the spur 68 and the inner face of the cylindrical drum 67. Since drum member 64 is secured to the shaft 66, it will rotate therewith and the spurs 68 will be caused to travel in a circular path. The primary purpose of the spurs 68 is to engage the stamps 39 and 42 to move them along the chute 47. Since the spurs 68 travel in a circular path and the stamps are constrained to move along a relatively plane surface, the openings 43 in the stamps 39 and 42 would be torn as the spurs 68 moved downwardly along their circular path out of contact with the stamps 39 and 42. In order to prevent this tearing of the stamps, a cam 72 is positioned within the hollow portion of the drum member 64. Since the cam 72 is secured to an upright rigid support 73, which also rotatably supports the drive shaft 66, there will be relative movement between the cam 72 and the drum 64. This relative movement and the cooperative shaping of the cam 72 is utilized to cause the spurs 68 to recede radially into the drum member 64 after each of the successive pins 68 has caused the required forward movement for the stamp strips 39 and 42. The exact shaping of the cam 72 to accomplish this desirable result is shown in Fig. 4. In this figure it is shown that spur 68a, which is riding the lobe 74 of the cam 72, is relatively extended whereas the spur 68b, which has just passed over the lobe 74 of the cam 72, is retracted within the drum member 64. This retraction of the spur 68 withdraws these pins or spurs 68 from contact with the opening 43 in the stamp strips 39 and 42 without tearing or otherwise damaging the said stamp strips.

Drive mechanism

In order to separately control the dispensing of the separate strips 39 and 42, the drum members associated with these strips are mounted upon separate drive shafts. Drum 64 that is adapted to move the single strip 39, is mounted as previously set forth on the drive shaft 66, whereas the drum 64 which moves the five wide strip of stamps 42 is mounted on concentric shaft 76. The mechanism for separately rotating these shafts 66 and 76 the required distance is clearly shown in Figs. 2 and 8. In Fig. 8 it will be noted that the dial selectors 26 are both mounted for rotation about a vertical axis. The inner dial 26*i* is secured directly to an upright shaft 77 that is properly journaled in the base plate 21 and by the supporting structure 78. Since there is a direct connection between the inner dial 26*i* and the shaft 77, rotation of the dial 26*i* will cause rotation of the shaft 77. Motion of this inner dial 26*i* is transmitted directly to the outermost of the drums 64 by the bevel gears 79 and 81 secured respectively to the shaft 77 and 66. The gear ratio used is designed so that movement of the dial selector 26*i* through an arc of 1/10 of its circumference or 36° will cause rotational movement of the outer drum 64 a corresponding number of degrees to move the strip of stamps 39 across the chute 47 the length of one stamp.

As previously stated, it is intended that this machine will be able to dispense either single stamps, in number from one to ten or a greater number of stamps in units of ten. Accordingly, it is necessary that rotation of the outer or exterior dial 26*e* through an angle of 36° will cause ten stamps to be dispensed. Since the stamp strip 42 is only five stamps wide, it is necessary that the drum 64 engaging the stamp strip 42 move this strip forward the length of two stamp for each 36° rotation of the outer dial 26*e*. This desirable ratio is obtained through use of the bevel gears 83 and 84, which are secured respectively to the hollow drive shafts 86 and 76. As shown in Fig. 8, a drive shaft 86 is interconnected with the outer dial 26*e* for rotation about the shaft 77, whereas the shaft 76, as previously explained, rotates about the shaft 66.

Stop mechanism

During operation of the presently described device, it has been found that under different conditions, different people naturally rotate a dial selector through varying degrees of rotation, even though their finger be placed in the identical opening before moving the dial selector toward the stop. This difference in operating characteristics is in large measure accounted for by the difference in finger sizes for different people. However, it is also possible that the angularity of the finger with respect to the stop, can change the angle of rotation. Correct operation of the stamp dispensing device, described herein, is dependent upon the movement of the stamps a distance corresponding to the length of the stamps or to some multiple thereof. If the dial selector is rotated only a minor portion of the 36°, there is a likelihood that the stamp will be chopped in half or otherwise mutilated. To prevent such results and assure proper synchronization of the dial selectors 26 and the dispensing drums 64, a special stop mechanism is provided that assures correct operation of the machine. A first feature to be noted in connection with this special stop mechanism is the fact that the dial selectors 26 are directly connected to the drive shafts 77 and 86. There is no ratchet connection and consequently, the dial selectors themselves do not return to an initial position. A second feature to be noted is the fact that the stop arm 89 is rotatably mounted with respect to the dial selectors 26 or the supporting frame itself. Actually, the stop 89 is connected to a bushing 91 which fully rotates about the shaft 86. A spring 92 tends to hold the stop 89 in its at rest position as shown in Figs. 1, 2, 5, 8 and 10. An arm 93 extends outwardly from the bushing 91 at a position disposed away from the stop arm 89 itself. This arm 93 is adapted for engagement with a linkage mechanism 94 that is interconnected by means of link 96 to a pendulum support arm 97. A pendulum stop 98 is pivotally secured to the support arm 97 for free movement with respect thereto as shown at 98' in Fig. 2. Upper and lower stop gears 99*u* and 99*s*, having teeth 101 thereon, are respectively secured to the shafts 86 and 77 for rotation therewith.

Figure 9:
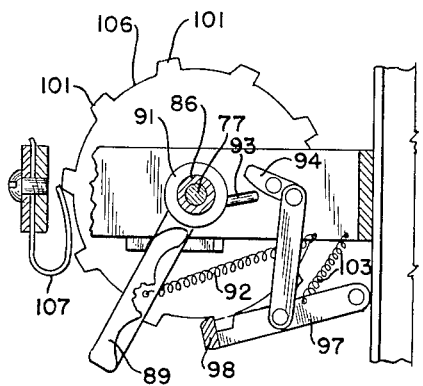
Fig. 9 is a partial plan view showing the working arrangement of a stop mechanism.
Figure 10:
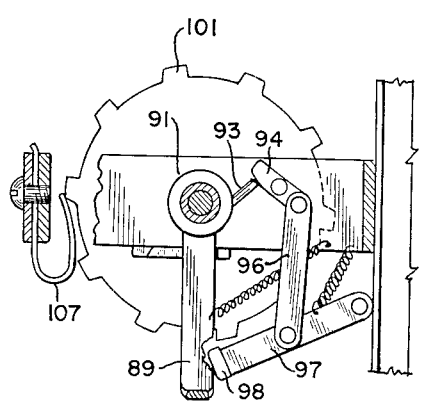
Fig. 10 is a plan view showing additional features of the stop mechanism shown in Fig. 9.

In operation, the operator's forefinger is inserted in one of the openings 102 in either of the dial selectors 26, the dial is then rotated until the finger comes into contact with the stop 89. Further rotation of the dial selector 26 causes a corresponding rotation of the stop 89. This rotation of the stop 89 is shown in Fig. 9 and causes the arm 93 to come out of contact with the linkage 94, thereby allowing the pendulum arm 97 to move inwardly toward the gear stop 99*u* and 99*s* under the action of the spring pressure exerted by the spring 103. As this forward movement continues, both the upper and lower ends 104 and 106 of the pendulum 98 come into contact with the relatively flat spaces 106 of the gear stops 99*u* and 99*s* disposed between the gear teeth 101. Further continued movement of the stop 89 will bring the pendulum member 98 into contact with the face of the teeth 101, thereby stopping the shafts 86, 77, 76 and 66 at the proper positions to assure the full desired movement of the stamps being dispensed. To prevent any backward movement of the dial selectors 26, as the operator's finger is removed from the openings 102, a spring catch 107 as shown in Figs. 8, 9 and 10 is adapted for engagement with the teeth 101 of the upper and lower gear stops 99. Since the dial selectors 26*i* and 26*e* rotate with respect to each other, any numerals or letters indicating the positon of the dial selector must be stamped or otherwise marked on the plate 108 which is positioned below the outer dial selector 26*e*. As shown in Fig. 5, numerals stamped on this plate 108 will show up through the openings 102 in the dial selectors 26.

Cutoff mechanism

A preferred type of cutoff mechanism is shown in Figs. 3, 5, 6 and 7. In Fig. 5 it will be noted that as the stamps 39 and 42 pass outwardly from the chute 47, they are passed over a stationary cutting edge 112. This edge provides one-half of a shearing mechanism that is used to cut the stamps from the strips 39 and 42. The other shearing edge is provided by a helically formed blade 113 mounted for rotation with a shaft 114 disposed in front of the cutting edge 112. To assure proper alignment with the stationary edge 112, the helically formed cutting blade 113 is trimmed so that the cutting edge 116 thereon is equi-distant from the axis of the shaft 114. With this arrangement rotation of the cutting blade 113 will cause progressive shearing action of the stamp strips 42 and 39. To effect the desired rotation and preferably to attain a relatively high speed during such rotation, a spring loaded catch released mechanism is used. The operational features of this mechanism are shown in Figs. 5, 6 and 7. It will be noted that the arm 34 of the drive handle 29 contacts rotatable mounted member 117. This member 117 is secured to the free end of a spring 118, the fixed end of which is secured to a frame member 119. As the handle 29 is pulled back toward the operator, the arm 34 causes the spring 118 to be tightly wound. As the movement progresses, member 117 and the sear 119 mounted for rotation on the member 117 are moved downwardly into contact with a tripping member 121. When the face 122 of the sear 119 comes into engagement with the tripping member 121, the sear is caused to rotate about pivot pin 123 and the catch end 124 of the sear then releases pin 126, which is mounted on a carrier plate 127. As the pin 126 is released, the carrier plate and the shaft 114, to which it is secured, are allowed to rotate under the action of the spring 118, thereby causing rotation of the helical blade 113 and consequent shearing of the stamp strips 39 and 42. Thereafter, the handle 29 may be moved to its at rest position against the stop 33, where the arm 34 will again be in engagement for moving the member 117.

A separate type of stamp severing mechanism is shown in Figs. 11, 12 and 13. In this embodiment of the invention, the inventor utilizes an operating handle 131 which extends beyond the cover 22, this handle has a spring plunger 132 and a link member 133 connected therewith. The plunger 132 is positioned so that it will come into contact with a plate 134 which is positioned above the strip of stamps 39 and member 133 is interconnected with a pivotally secured stamp guide member 136. To operate this stamp severing mechanism, thumb pressure is applied to the operating handle 131 to move it downwardly. As shown in Fig. 12, initial downward movement of the handle 131 causes the plunger 132 to come in contact with the plate 134. This moves the plate 134 into engagement with the stamps 39 to hold them in fixed relation with respect to the bed plate 137. Further movement of handle 131 causes outward movement of the pivoted member 136 and at this movement projection 138 pinches the strip 39 against the face 139 of the pivoted member 136. Continued movement of the handle 131 will cause tearing of the stamps 39 as desired. Necessarily for proper usage of this type of stamp severing mechanism, the stamp strips should be perforated as necessary.

While separate embodiments of this invention have been shown and described, it is apparent that the mechanisms disclosed herein are adaptable to modification so that they may be used in similar types of dispensing devices. Likewise, while the entire mechanism has been described as being enclosed within a cover 22, it is apparent that for special installations, the entire mechanism could be installed beneath the top of a table or inside a counter so that the stamps would be dispensed directly to the customer being serviced at such counter or table. Many other modifications of the present invention are possible. Accordingly, the inventor prefers not to be limited to the specific arrangement of parts and mechanisms described and shown, and instead he intends only to be limited within the scope of the hereunto appended claims.

What is claimed is:

1. In a stamp dispensing machine having a housing and a supporting frame mounted therein, a pair of parallel stamp supporting platforms, one of which is adapted to support a single continuous width strip of stamps, and the other of which is adapted to support a plural unit width continuous strip of stamps, a pair of concentrically independently manually operable rotatable dials mounted on concentric shafts and provided with a plurality of circumferentially arranged finger holes to constitute separate selector dials, a pair of feed drums, one for feeding each strip, said drums being driven separately by said separate shafts of said separate dials for separately feeding said separate strips, a finger lever rotatably carried by one of said concentric shafts and extending over the finger holes of both of said dials so as to be engaged by the operator's finger upon reaching a predetermined point in the rotation of either dial, a brake drum carried by each of said concentric shafts, a brake drum engaging member normally maintained out of engagement with said brake drums and operated by a predetermined degree of rotation of said finger lever, after engagement by the operator's finger while in a finger hole in a selector dial, to engage both brake drums to prevent movement of both of said concentric shafts to prevent forward strip feed by either feed drum.

2. In a stamp dispensing machine having a housing and a supporting frame mounted therein, a pair of parallel stamp supporting platforms, one of which is adapted to support a single continuous width strip of stamps, and the other of which is adapted to support a plural unit width continuous strip of stamps, a pair of concentrically independently manually operable rotatable dials mounted on concentric shafts and provided with a plurality of circumferentially arranged finger holes to constitute separate selector dials, a pair of feed drums, one for feeding each strip, said drums being driven separately by said separate shafts of said separate dials for separately feeding said separate strips, a finger lever rotatably carried by one of said concentric shafts and extending over the finger holes of both of said dials so as to be engaged by the operator's finger upon reaching a predetermined point in the rotation of either dial, a brake drum carried by each of said concentric shafts, a brake drum engaging member normally resiliently maintained out of engagement with said brake drums and operated by a predetermined degree of rotation of said finger lever, after engagement by the operator's finger while in a finger hole in a selector dial, to engage both brake drums to prevent movement of both of said concentric shafts to prevent forward strip feed by either feed drum, and means for engaging said brake drums for preventing reverse rotation thereof and said shafts and said feed drums carried thereby.

3. In a stamp dispensing machine having a housing and a supporting frame mounted therein, a pair of parallel stamp supporting platforms, one of which is adapted to support a single continuous width strip of stamps, and the other of which is adapted to support a plurality unit width continuous strip of stamps, each of said strips of stamps having regularly longitudinally spaced feed openings therein, a pair of concentrically independently manually operable rotatable dials mounted on concentric shafts and provided with a plurality of circumferentially arranged finger holes to constitute separate selector dials, a pair of feed drums, one for feeding each strip, each drum having a plurality of circumferential resiliently radially inwardly urged feed fingers to engage the holes in the respective strip, said drums being driven separately by said separate shafts of said separate dials for separately feeding said separate strips, a finger lever rotatably carried by one of said concentric shafts and extending over the finger holes of both of said dials so as to be engaged by the operator's finger upon reaching a predetermined point in the rotation of either dial, a brake drum carried by each of said concentric shafts, a brake drum engaging member normally resiliently maintained out of engagement with said brake drums and operated by a predetermined degree of rotation of said finger lever, after engagement by the operator's finger while in a finger hole in a selector dial, to engage both brake drums to prevent movement of both of said concentric shafts to prevent forward strip feed by either feed drum, each of said feed drums being provided with an internally arranged single lobe cam, against which said feed fingers are resiliently urged, the lobe being so formed as to urge the feed fingers into engagement with the strip holes during forward feed and insure their withdrawal by dropping behind the cam, to be retained therebehind, upon the completion of the forward feed operation of each feed finger.

4. In a stamp dispensing machine having a housing and a supporting frame mounted therein, a pair of parallel stamp supporting platforms, one of which is adapted to support a single continuous width strip of stamps, and the other of which is adapted to support a plural unit width continuous strip of stamps, each of said strips of stamps having regularly longitudinally spaced feed openings therein, a pair of concentrically independently manually operable rotatable dials mounted on concentric shafts and provided with a plurality of circumferentially arranged finger holes to constitute separate selector dials, a pair of feed drums, one for feeding each strip, each drum having a plurality of circumferential resiliently radially inwardly urged feed fingers to engage the holes in the respective strip, said drums being driven separately by said separate shafts of said separate dials for separately feeding said separate strips, each of said feed drums being provided with an internally arranged single lobe cam, against which said feed fingers are resiliently urged, the lobe being so formed as to urge the feed fingers into engagement with the strip holes during forward feed and insure their withdrawal by dropping behind the cam, to be retained therebehind, upon the completion of the forward feed operation of each feed finger.

5. In a stamp dispensing machine having a housing and a supporting frame mounted therein, a pair of parallel stamp supporting platforms, one of which is adapted to support a single continuous width strip of stamps, and the other of which is adapted to support a plural unit width continuous strip of stamps, each of said strips of stamps having regularly longitudinally spaced feed openings therein, a pair of concentrically independently manually operable rotatable dials mounted on concentric shafts and provided with a plurality of circumferentially arranged finger holes to constitute separate selector dials, a pair of feed drums, one for feeding each strip, each drum having a plurality of circumferential resiliently radially inwardly urged feed fingers to engage the holes in the respective strip, said drums being driven separately by said separate shafts of said separate dials for separately feeding said separate strips, a finger lever rotatably carried by one of said concentric shafts and extending over the finger holes of both of said dials so as to be engaged by the operator's finger upon reaching a predetermined point in the rotation of either dial, a brake drum carried by each of said concentric shafts, a brake drum engaging member normally resiliently maintained out of engagement with said brake drums and operated by a predetermined degree of rotation of said finger lever, after engagement by the operator's finger while in a finger hole in a selector dial, to engage both brake drums to prevent movement of both of said concentric shafts to prevent forward strip feed by either feed drum, each of said feed drums being provided with an internally arranged single lobe cam, against which said feed fingers are resiliently urged, the lobe being so formed as to urge the feed fingers into engagement with the strip holes during forward feed and insure their withdrawal by dropping behind the cam, to be retained therebehind, upon the completion of the forward feed operation of each feed finger.

6. In a stamp dispensing machine having a housing and a supporting frame mounted therein, a pair of parallel stamp supporting platforms, one of which is adapted to support a single continuous width strip of stamps, and the other of which is adapted to support a plural unit width continuous strip of stamps, each of said strips of stamps having regularly longitudinally spaced feed openings therein, a pair of concentrically independently manually operable rotatable dials mounted on concentric shafts and provided with a plurality of circumferentially arranged finger holes to constitute separate selector dials, a pair of feed drums, one for each strip, each drum having a plurality of circumferential resiliently radially inwardly urged feed fingers to engage the holes in the respective strip, said drums being driven separately by said separate shafts of said separate dials for separately feeding said separate strips, a finger lever rotatably carried by one of said concentric shafts and extending over the finger holes of both of said dials so as to be engaged by the operator's finger upon reaching a predetermined point in the rotation of either dial, a brake drum carried by each of said concentric shafts, a brake drum engaging member normally resiliently maintained out of engagement with said brake drums and operated by a predetermined degree of rotation of said finger lever, after engagement by the operator's finger while in a finger hole in a selector dial, to engage both brake drums to prevent movement of both of said concentric shafts to prevent forward strip feed by either feed drum, each of said feed drums being provided with an internally arranged single lobe cam, against which said feed fingers are resiliently urged, the lobe being so formed as to urge the feed fingers into engagement with the strip holes during forward feed and insure their withdrawal by dropping behind the cam, to be retained therebehind, upon the completion of the forward feed operation of each feed finger, and means for engaging said brake drums to prevent reverse rotation of said brake drums, said shafts and said feed drums.

References Cited in the file of this patent

UNITED STATES PATENTS

| Number | Name | Date |
|---|---|---|
| 617,819 | Smyser | Jan. 17, 1899 |
| 948,944 | Moore | Feb. 8, 1910 |
| 1,431,266 | Sherman | Oct. 10, 1922 |
| 1,788,949 | Grunwald | Jan. 13, 1931 |
| 1,846,811 | Link | Feb. 23, 1932 |
| 1,898,141 | Piper | Feb. 21, 1933 |
| 1,972,851 | McCarthy | Sept. 4, 1934 |
| 2,001,903 | Furrer | May 21, 1935 |
| 2,102,651 | Sherman et al. | Dec. 21, 1937 |
| 2,130,473 | Ruau | Sept. 20, 1938 |
| 2,181,826 | Wooster | Nov. 28, 1939 |
| 2,258,912 | Steen et al. | Oct. 14, 1941 |
| 2,264,647 | Stearns | Dec. 2, 1941 |
| 2,289,161 | Zalkind | July 7, 1942 |
| 2,293,433 | Gautier | Aug. 18, 1942 |
| 2,333,108 | Krueger et al. | Nov. 2, 1943 |
| 2,350,281 | Krueger et al. | May 30, 1944 |
| 2,400,776 | Nordeen et al. | May 21, 1946 |
| 2,402,074 | Nield | June 11, 1946 |
| 2,417,731 | Birr | Mar. 18, 1947 |
| 2,518,069 | Roper | Aug. 8, 1950 |
| 2,601,062 | Singer | June 17, 1952 |
| 2,601,790 | Magnusson | July 1, 1952 |